US011382258B1

(12) United States Patent
Houck (10) Patent No.: US 11,382,258 B1
(45) Date of Patent: Jul. 12, 2022

(54) DEPTH CONTROL FOR A SEED PLANTING SYSTEM (71) Applicant: Shane Houck, Pennville, IN (US)

(72) Inventor: Shane Houck, Pennville, IN (US)

(*) Notice: Subject to any disclaimer, the term of this patent is extended or adjusted under 35 U.S.C. 154(b) by 188 days.

(21) Appl. No.: 16/570,289

(22) Filed: Sep. 13, 2019

Related U.S. Application Data (63) Continuation of application No. 15/394,263, filed on Dec. 29, 2016, now Pat. No. 10,412,881, which is a continuation-in-part of application No. 14/623,758, filed on Feb. 17, 2015, now Pat. No. 9,554,504.

(60) Provisional application No. 61/941,642, filed on Feb. 19, 2014.

(51) Int. Cl.
*A01C 7/20* (2006.01)
*A01B 63/00* (2006.01)
*A01B 63/114* (2006.01)
*A01B 49/06* (2006.01)
*A01B 79/00* (2006.01)
(Continued)

(52) U.S. Cl.
CPC ............. *A01C 7/203* (2013.01); *A01B 49/06* (2013.01); *A01B 63/008* (2013.01); *A01B 63/114* (2013.01); *A01B 79/005* (2013.01); *A01C 7/205* (2013.01); *G05D 1/0219* (2013.01); *A01C 5/064* (2013.01); *G05D 2201/0201* (2013.01)

(58) Field of Classification Search
CPC ......... A01C 7/203; A01C 7/205; A01C 5/064; A01B 49/06; A01B 63/00; A01B 63/114
See application file for complete search history.

(56) References Cited

U.S. PATENT DOCUMENTS

| 3,673,970 A | 7/1972 | Hatcher |
| 3,749,035 A | 7/1973 | Cayton et al. |
| 4,044,697 A | 8/1977 | Swanson |

(Continued)

FOREIGN PATENT DOCUMENTS

| CA | 2758221 A1 * | 5/2013 | ............. A01B 63/16 |
| EP | 2 554 036 A1 | 2/2013 | |

OTHER PUBLICATIONS

Precision Planting, Inc. [online] "DeltaForce Hardware Installation", Nov. 2013, Retrieved from the Internet: https://cloud.precisionplanting.com/pubs/?view=0Bx7V2J-P2yNZcU0zMU5qbThxem8, 25 pgs.

(Continued)

*Primary Examiner* — Alicia Torres
(74) *Attorney, Agent, or Firm* — Christensen, Fonder, Dardi & Herbert PLLC (57) ABSTRACT A planting system including a plurality of seeding row assemblies, each having components maintained at a controlled elevation. The seeding row assembly includes a tillage row unit controlled to maintain a desired elevation relative to a seeding row unit, the seeding row unit being configured to passively follow the local terrain. Each seeding row assembly can include two position sensors that generate signals corresponding to the elevation of the seeding row unit and the ground engagement attachment, respectively, or a differential positon sensor that generates signals corresponding to the difference in the elevations. Various embodiments include a local closed loop controller that adjusts elevation of the tillage row unit relative to the seeding row unit to a desired set point. In some embodiments, the down force of the seeding row unit is actively controlled.

8 Claims, 8 Drawing Sheets (51) Int. Cl.
*G05D 1/02* (2020.01)
*A01C 5/06* (2006.01)

(56) References Cited

U.S. PATENT DOCUMENTS

| | | | |
|---|---|---|---|
| 4,176,721 A | 12/1979 | Poggemiller et al. | |
| 4,353,423 A | 10/1982 | Poggemiller et al. | |
| 4,377,979 A | 3/1983 | Peterson et al. | |
| 4,422,511 A | 12/1983 | Poggemiller et al. | |
| 4,444,271 A | 4/1984 | Dietrich, Sr. | |
| 4,506,609 A | 3/1985 | Fuss et al. | |
| 4,660,653 A * | 4/1987 | Mayeda | A01B 39/14 172/169 |
| 5,479,992 A | 1/1996 | Bassett | |
| 5,499,683 A | 3/1996 | Bassett | |
| 5,590,721 A | 1/1997 | Van Mill | |
| 5,640,914 A | 6/1997 | Rawson | |
| 5,653,292 A | 8/1997 | Ptacek et al. | |
| 6,085,846 A | 7/2000 | Buehl et al. | |
| 6,971,452 B2 | 12/2005 | Ocsenknecht et al. | |
| 8,201,637 B2 | 6/2012 | Ripple | |
| 8,235,130 B2 | 8/2012 | Henry et al. | |
| 8,448,717 B2 | 5/2013 | Adams et al. | |
| 8,534,373 B2 | 9/2013 | Van Buskirk et al. | |
| 8,573,319 B1 | 11/2013 | Casper et al. | |
| 8,577,561 B2 | 11/2013 | Green et al. | |
| 8,601,961 B2 | 12/2013 | Van Buskirk et al. | |
| 8,657,023 B2 | 2/2014 | Casper et al. | |
| 8,857,530 B2 | 10/2014 | Henry | |
| 9,232,687 B2 | 1/2016 | Bassett | |
| 9,462,744 B2 * | 10/2016 | Isaacson | A01C 7/205 |
| 9,826,677 B2 * | 11/2017 | Gervais | A01C 7/205 |
| 10,765,054 B2 * | 9/2020 | Sauder | A01B 63/145 |
| 2008/0276847 A1 | 11/2008 | Forchino | |
| 2009/0301743 A1 | 12/2009 | Henry et al. | |
| 2012/0048159 A1 | 3/2012 | Adams et al. | |
| 2012/0060731 A1 | 3/2012 | Bassett | |
| 2013/0032363 A1 | 2/2013 | Curry et al. | |
| 2013/0192186 A1 | 8/2013 | Bassett | |
| 2014/0048296 A1 | 2/2014 | Bassett | |
| 2014/0060862 A1 | 3/2014 | Gilstring | |
| 2015/0073668 A1 * | 3/2015 | Achen | A01B 49/04 701/50 |
| 2015/0230391 A1 | 8/2015 | Houck | |
| 2016/0165789 A1 * | 6/2016 | Gervais | A01C 7/205 700/275 |
| 2019/0021211 A1 * | 1/2019 | Gutknecht | A01B 63/22 |
| 2019/0186911 A1 * | 6/2019 | do Amaral Assy | G01C 9/00 |

OTHER PUBLICATIONS

Precision Planting, Inc. [online] "vDrive and DeltaForce Harness Installation and Setup Manual", Nov. 2013, Retrieved from the Internet: https://cloud.precisionplanting.com/pubs/?download-0Bx7V2J, 43 pgs.

* cited by examiner

DEPTH CONTROL FOR A SEED PLANTING SYSTEM

RELATED APPLICATIONS

This application is a continuation of U.S. patent application Ser. No. 15/394,263, filed Dec. 29, 2016, which is a continuation-in-part of U.S. patent application Ser. No. 14/623,758, filed Feb. 17, 2015, now U.S. Pat. No. 9,554,504, which claims the benefit of U.S. Provisional Patent Application No. 61/941,642, filed Feb. 19, 2014. The disclosures of these related applications are incorporated by reference herein in their entirety.

FIELD OF THE DISCLOSURE

The disclosure is directed generally to agricultural implements, and more specifically to seed planting devices.

BACKGROUND OF THE DISCLOSURE

Seeding implements being manufactured at increasingly larger scales. Presently, these implements can be 120 feet in width and can have 54 or more individual seeding row units attached thereto. As the implement travels through the field, the frame is limited in the amount that it can flex in order to compensate for changes in the terrain. Such seeding implements utilize linkages to attach the individual seeding row unit to the implement frame. The linkages allow the individual seeding row units to move upward or downward in relationship to the implement frame. As the implement moves through the field, the movement of each individual seeding row unit is needed in order to compensate for lateral differences in the terrain or in the case of encountering an obstruction.

The individual seeding row units of these seeding implements can also include adjustable depth gauging wheels used to change the depth of seeding or tillage as soil conditions change. That is, the desired depth of seeding or tillage can be different for dry, hard or rocky soil than for soft, wet or sandy soil. Many seeding implements utilize hydraulic cylinders to apply force to the linkages to help the seeding row unit maintain the proper amount of penetration of the soil. Some further utilize hydraulic actuation of individual attachments ahead of each row. These attachments are used, for example, to move residue, perform tillage, or apply fertilizer ahead of each row.

Existing systems, however, do not provide a robust implementation wherein the operating depth of the tillage row unit is maintained in a known relationship with the operating depth of the associated seeding row unit.

SUMMARY OF THE DISCLOSURE

Various embodiments of the disclosure provide a robust implementation wherein an operating parameter, such as the operating depth of a tillage row unit relative to an associated seeding row unit, is dynamically maintained utilizing a central controller that sends set points to individual or grouped seeding row assemblies. Local controllers then control the individual or grouped seeding row assemblies to the received set points. In various embodiments, control to the set point variable is automated, for example by closed loop control.

Certain embodiments enable the operator to make on the go changes in the depth of the tillage row unit in relationship to the seeding unit. Accordingly, as soil conditions change the operator can instantly adjust the operating position of the tillage row units and/or the seeding row units from the tractor cab. In some embodiments, local soil conditions are correlated with coordinate positions provided, for example, by a global positioning system (GPS); the central controller can automatically update the control set points based on the GPS coordinate and the attendant soil conditions.

In some embodiments, either the seeding row unit or the tillage row unit is controlled to a position relative to the implement frame, and the other of the seeding row unit or the tillage row unit is actively controlled to target an operating position relative thereto. In some embodiments, one of the seeding row unit or the tillage row unit is exerted with a known downward force, and the other of the seeding row unit or the tillage row unit is actively controlled to target an operating position relative thereto.

In various embodiments, the seeding row unit and the tillage row unit both depend from an implement frame of the planter and are not directly coupled to each other. In one embodiment, the seeding row unit passively rides atop the terrain, with the depth of the seeding row unit relative to the implement frame being maintained by gauging wheels, while the tillage row unit is actively maintained at a depth relative to the seeding row unit by the local controller. By this arrangement, the need for direct linkage between the seeding row unit and the tillage row unit is eliminated, as well as any need for a second set of gauging wheels for maintaining the position of the tillage row unit.

Conventional seeding implements often utilize some type of individual tillage row unit ahead of each seeding row unit. The primary parameter that is characteristic of a successful seeding is the depth of the seed placement, which may be tailored to changing soiled conditions. Depth of seed placement can be affected not only by the operating depth of the seeding row unit, but also by the operating depth of the tillage row unit. Some planters, such as the John Deere Model 1770NT CCS planter, implement separate gauging wheels for the tillage row unit and the seeding row unit, the gauging wheels providing independent depth gauging for the respective tillage row unit and seeding row unit. This approach, of course, necessitates the mechanical complexity and cost of two sets of gauging wheels. In addition, any dynamic control for changing the depth of the tillage row unit relative to the seeding row unit must be designed to accommodate the presence of two sets of gauging wheels, further adding to the mechanical complexity and cost. Another approach is disclosed, for example, in U.S. Pat. No. 8,448,717 to Adams et al., disclosing a hydraulically driven tillage row unit coupled to a hydraulically driven seeding row unit. U.S. Pat. No. 8,201,637 to Ripple discloses a similar arrangement that utilizes reversible gear motors to drive the tillage implement. Coupling the tillage row unit to the seeding row unit can, to a certain extent, provide matching of the penetration depths of the tillage row unit and the seeding row unit. However, coupling the tillage row unit to the seeding row unit can present its own set of challenges. The vibration from the tillage row unit can translate to the seeding row unit, affecting the seeding distribution and general performance of the seeding row unit. Furthermore, altering the force exerted by the tillage row unit also influences the force exerted by the seeding row unit; that is, increasing the force to the tillage row unit "takes away" from the force exerted by the seeding row unit, thus requiring more force to be transferred to the seeding row unit, which in turn exerts still more force to the tillage row unit. This give-and-take dynamic between the tillage row unit and the seeding row unit can lead to control instabilities.

Other seeding implements utilize tillage row units that are coupled to the implement frame, thereby enabling down forces to be exerted independent of the seeding row unit. See, for example, U.S. Patent Application Publication No. 2013/0192186 to Bassett, disclosing a device that includes adjustable force gauging equipment coupled to the implement frame to maintain the tillage row unit at a substantially constant engagement force with the ground. However, maintaining constant forces on the tillage row unit and/or the seeding row unit does not assure that the respective operating depths of the tillage row unit and the seeding row unit are suitably matched, particularly where soil conditions can vary significantly. That is, the relative forces (e.g., force ratios or force differences) required between the tillage row unit and the seeding row unit can vary with soil conditions, adversely affecting depth differences and control therebetween. Furthermore, controlling to a constant force does not assure a desired penetration depth, especially under changing soil conditions over the course of a row planting. Ergo, control of the penetration depth is effectively open loop with force-controlled systems, and therefore prone to wide variations.

The various embodiments disclosed herein overcomes these shortcomings. Controlling the position metrics between the seeding row unit and the tillage row unit provides more direct control of seed placement depth, and also lends itself to automated depth control of seed placement for varying soil conditions. The optimum or desired planting depth may vary with the soil type. For example, the depth of the seed placement may be deeper for soil having a high sand content than for soil having a high clay content. In various embodiments, not only is the depth of seed placement more directly controlled, but the ability to change the depth of the seed placement based on soil composition and characteristics can be provided on the go.

Structurally, the tillage row units are coupled to the implement frame, thereby enabling down forces to be exerted independent of the seeding row unit. However, rather than maintaining constant forces on the tillage row unit and/or the seeding row unit, various embodiments of the disclosure endeavor to control the relative operating position between the tillage row unit and the seeding row unit.

In one embodiment, the control system electronically monitors and send an electronic signal to make changes in the position of the tillage row units. In one embodiment, an electro-hydraulic valve system receives the electronic signal and makes adjustments in hydraulic oil flow to change the position of the tillage row units relative to the implement frame.

The principles presented herein can also be used to control tillage row units on tillage and fertilizer application implements.

DETAILED DESCRIPTION OF THE DRAWINGS

Referring to FIGS. 1, 2, and 2A through 2D, a seed planting system 30 is depicted in an embodiment of the disclosure. The seed planting system 30 includes a seeding implement 32 including an implement frame 34, a plurality of seeding row assemblies 36 operatively coupled with the implement frame 34, and a control system 38 operatively coupled with each of the seeding row assemblies 36. The implement frame includes a cross member 34a, as well as appurtenances that are in fixed relation to the cross member 34a for mounting the seeding row assemblies 36 thereto, such as a yoke 34b. In one embodiment, the seed planting system 30 also includes a towing unit 42, such as a tractor or crawler. The towing unit 42 can include a hydraulic pressure source 44.

Figure 1:
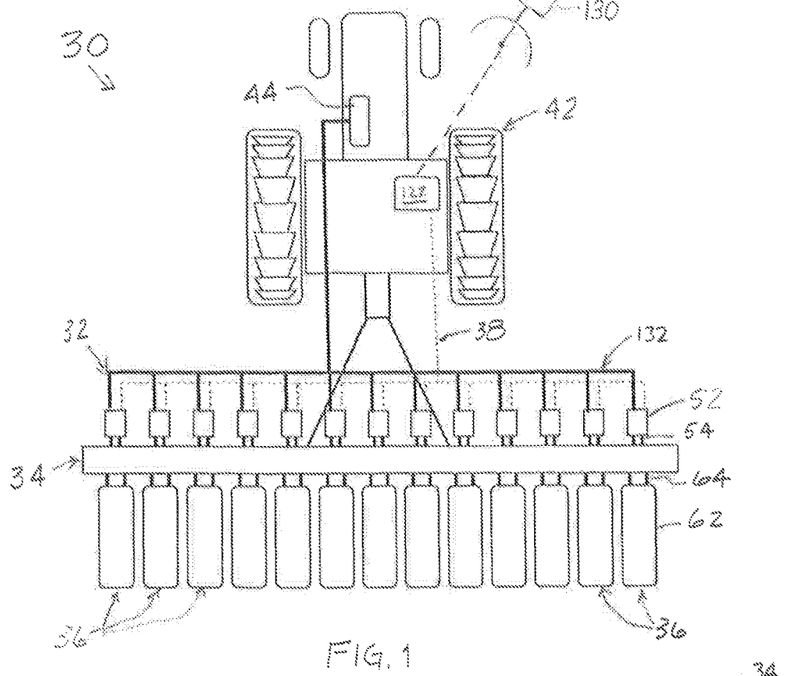
FIG. 1 is a plan view of a seed planting system in an embodiment of the disclosure.
Figures 2, 2A, 2B:
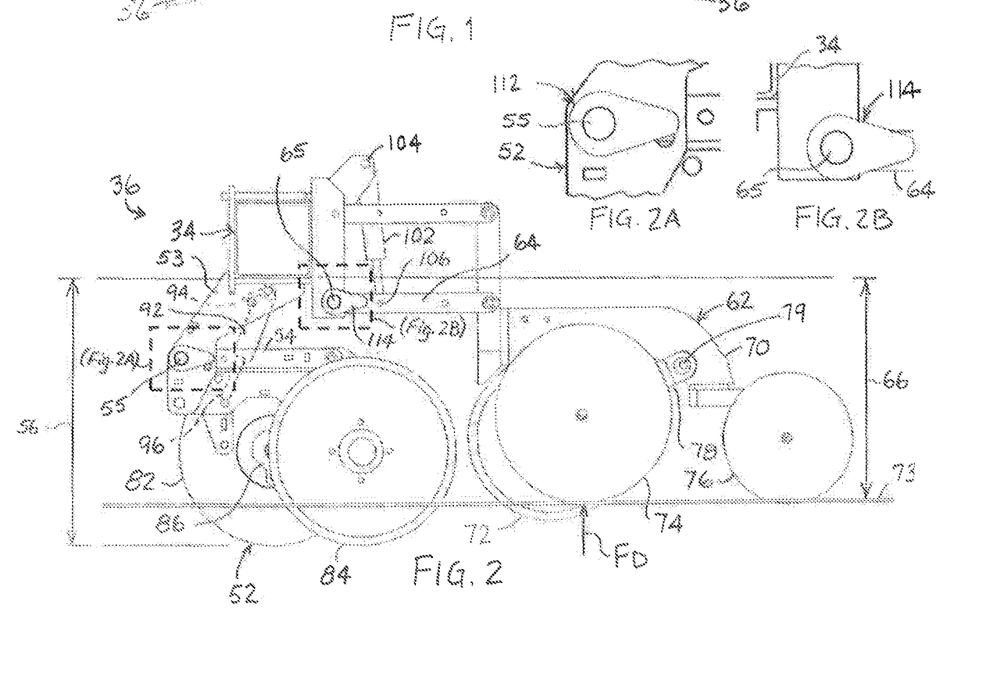
FIG. 2 is an elevation view of a seeding row assembly utilizing a pair of position sensors in an embodiment of the disclosure.
FIGS. 2A and 2B are partial views of the seeding row assembly of FIG. 2, depicting the position sensors of FIG. 2.
Figure 2C:
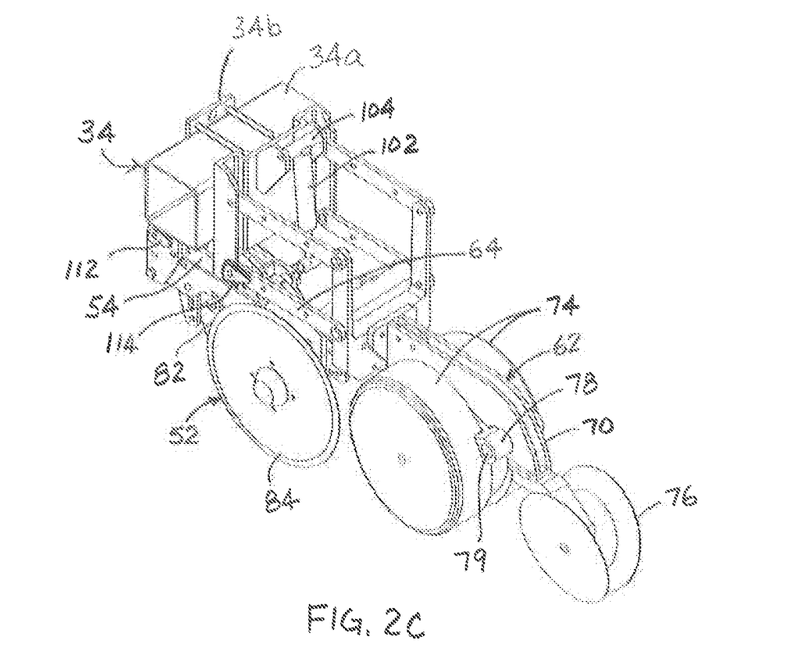
FIGS. 2C and 2D are perspective views of the seeding row assembly of FIG. 2.
Figure 2D:
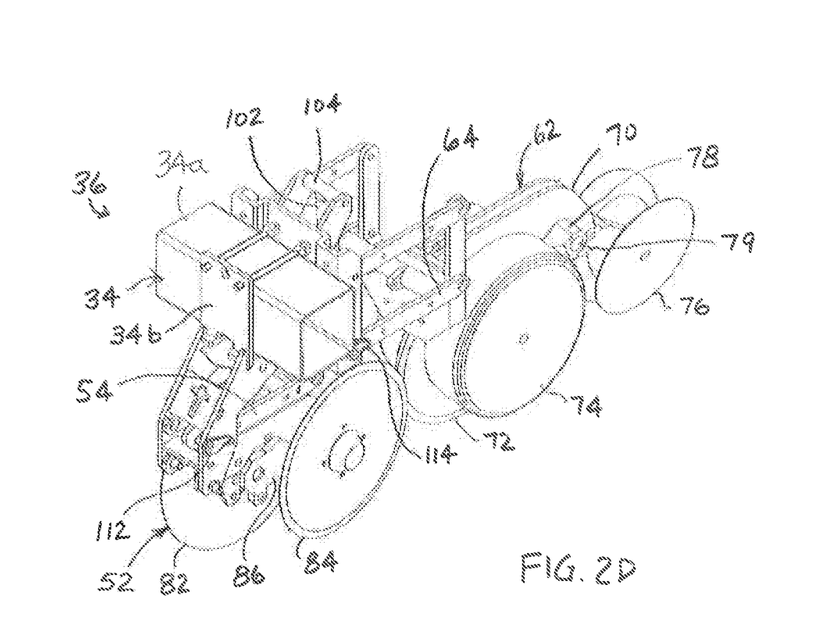

Each of the seed row assemblies 36 includes a ground engaging attachment or tillage row unit 52 coupled to a rigid frame 53 by a first linkage 54 operatively about a pivot 55, the rigid frame 53 depending from the implement frame 34. The first linkage 54 is for adjusting an elevation 56 of the tillage row unit 52 relative to the implement frame 34. Each seed row assembly further includes a seeding row unit 62 including a second linkage 64 operatively coupled with the implement frame 34 and rotatable about a pivot 65 for accommodation of an elevation 66 of the seeding row unit 62 relative to the implement frame 34. In various embodiments, the seeding row unit 62 is in substantial forward/aft alignment with the tillage row unit 52.

The seeding row unit 62 can include appurtenances common in the art that depend from a row unit frame 70. Such appurtenances include a follower 74, such as gauging wheels, that registers on a terrain 73, and can further include a furrow opener 72 and a pair of closing wheels 76. In the depicted embodiment, the follower 74 is attached to the row unit frame 70 by a pivot arm 78 that pivots about a pivot pin 79. In the depicted embodiment, the tillage row unit 52 comprises a leading disc blade 82 and a trailing disc blade 84, both rotatably coupled to disk blade plate 86. The tillage row unit 52 can include other devices in addition to or instead of the disc blades 82, 84, including, for example, a fertilizer shoe and/or a residue remover (not depicted).

Each of the seed row assemblies 36 can further include a tillage row actuator 92 operatively coupled between the implement frame 34 and the tillage row unit 52 or linkage 54, the tillage row actuator 92 including a base portion 94 and a free portion 96, the free portion 96 being translatable relative to the base portion and being operatively coupled with the tillage row unit 52 for adjustment of the elevation 56 of the tillage row unit 52 relative to the implement frame 34.

In some embodiments, each of the seed row assemblies 36 further includes a seeding row actuator 102 operatively coupled between the implement frame 34 and the seeding row unit 62, the seeding row actuator 102 including a base portion 104 and a free portion 106, the free portion 106 being translatable relative to the base portion 104, and the free portion 106 being operatively coupled with the seeding row unit 62 for adjustment of the down force FD of the seeding row unit 62.

Figure 3:
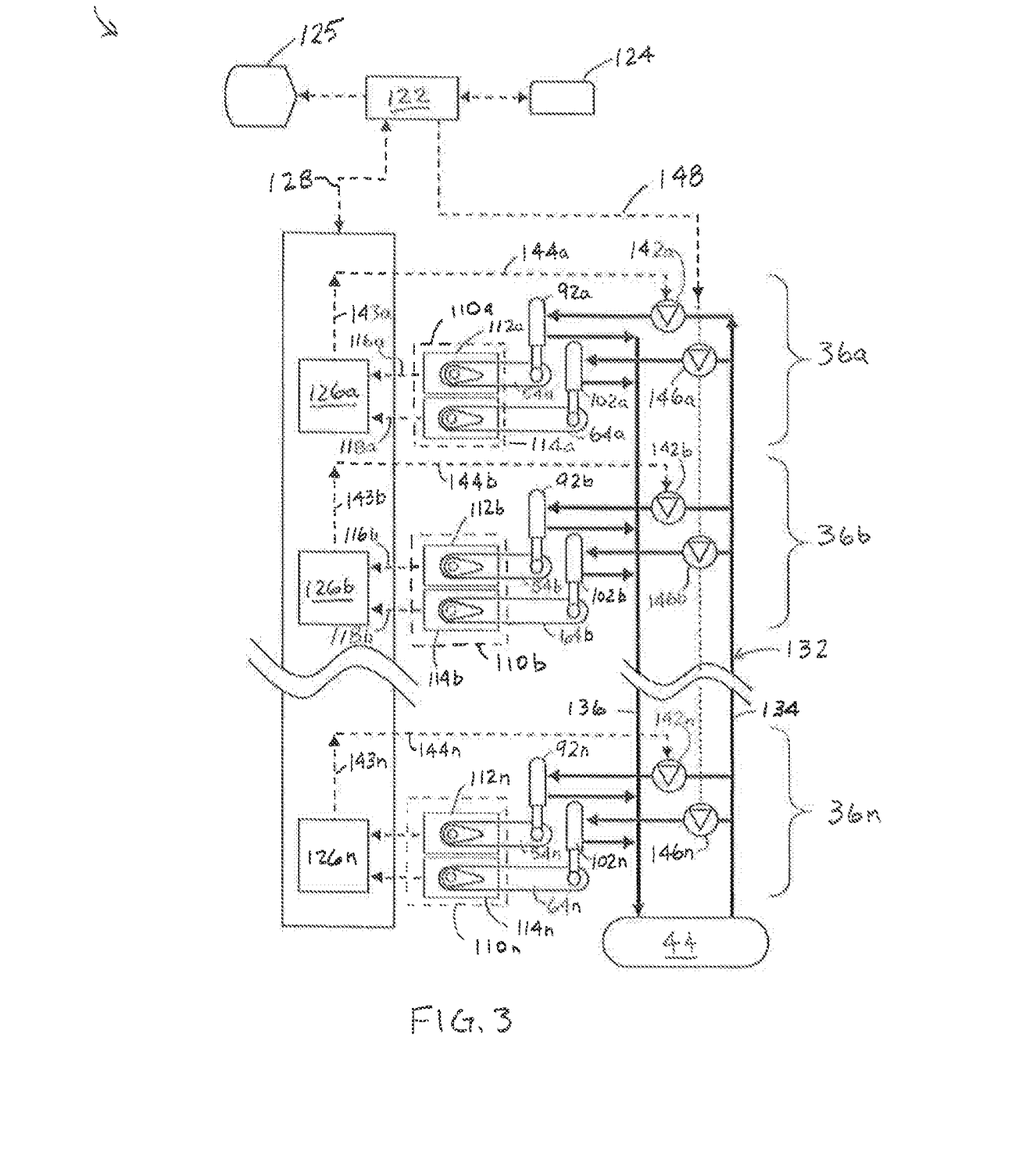
FIG. 3 is a schematic of a control system utilizing the pair of position sensors of FIG. 2 in an embodiment of the disclosure.

Referring to FIG. 3, the control system 38 is schematically depicted in an embodiment of the disclosure. The components associated with the seeding row assemblies 36 are individually depicted in FIG. 3 by the numerical reference 36, followed by a letter suffix (e.g., seeding row assemblies 36a, 36b and 36n), which are collectively or generically referred to as seeding row assembly 36. Likewise, various components for each seeding row assembly 36 are referred to by a numerical reference followed by the same letter suffix as the respective seeding row assembly 36, the components being referred to collectively or generically by the numerical reference. The components numbered in this fashion include the above-described first linkage 54, second linkage 64, tillage row actuator 92, and seeding row actuator 102, as well as position sensing module 110, position sensors 112 and 114, signals 116 and 118, local controllers 126, adjustment device 142, output 143, signal line 144, and adjustment device 146, which are described below. Also for FIG. 3, communication lines are depicted with dashed arrows and hydraulic lines depicted with heavy solid arrows.

Each of the seeding row assemblies 36 can further comprise a position sensing module 110. In certain embodiments, the position sensing module 110 includes position sensors 112 and 114 operatively coupled to the first linkage 54 and the second linkage 64, respectively, that output signals 116 and 118, respectively, corresponding to the sensed position. The position sensors 112 and 114 are arranged to detect an angular rotation of the respective linkages 54 and 64 about their respective pivots 55 and 65, as depicted herein, for example by a rotating potentiometer. In other embodiments, position sensing can be provided by magnetostrictive sensors or linear sliding devices, such as sliding potentiometers or linear variable differential transformers (LVDT). One embodiment of the position sensors 112, 114 is discussed below attendant to FIG. 7.

The control system 38 comprises a central controller 122 operatively coupled to a user interface 124 and a display 125. The central controller 122, user interface 124, and display 125 can be located on or within the towing unit 42, enabling the operator to make on the go changes. In some embodiments, a plurality of local controllers 126 is in communication with the central controller 122 via a communications link 128, for receiving, for example, set points from the central controller 122. In one embodiment, the communications link is a wired device, such as a cable or bus. In other embodiments, the communications link 128 is a wireless link (e.g., a BLUETOOTH or a WI-FI link) for wireless communication between the central controller 122 and the local controllers 126. In some embodiments, the central controller 122, user interface 124, and display 125 is a highly integrated unit, such as a smart phone, electronic tablet, or other handheld unit. In various embodiments, the central controller 122 includes a microprocessor that executes algorithms contained in non-transitory computer-readable memory. The local controllers 126 can also be microprocessor based, executing instructions received from the central controller 122 and/or executing algorithms contained in non-transitory computer-readable memory.

The central controller 122 can also be configured to receive location coordinates of the seed planting system 30, for example by communication with a global positioning system (GPS) 130. In one embodiment, the central controller 122 includes or has access to information regarding the local soil conditions correlated to the location coordinates. In one embodiment, the set points generated by the central controller 122 is based, at least in part, on the soil conditions corresponding to the location coordinates. That is, by way of non-limiting example, the operating depth of the tillage row unit 52 relative to the seeding row unit 62 may be established at a deeper depth for location coordinates corresponding to soil having a high sand content than for soil having a high clay content.

In one embodiment, the actuators 92 and 102 are linear hydraulic cylinders (as depicted), which are operatively coupled with a hydraulic pressure circuit 132 that is sourced, for example, the hydraulic pressure source 44 of the towing unit 42. The hydraulic pressure circuit can include source lines 134 and return lines 136. Other type actuators can also be implemented, such as rotational hydraulic actuators, linear or rotational pneumatic actuators, and/or linear or rotational actuators powered by an electric motor. In some embodiments, all actuators are of the same type; other embodiments utilize a mix of actuator types.

In various embodiments, each actuator 92 for each tillage row unit 52 is in fluid communication with the hydraulic pressure source 44 via an adjustment device 142, such as an electro-hydraulic control valve. Each adjustment device 142 can be controlled by an output 143 of the respective local controller 126 via, for example, a signal line 144. In certain embodiments, each actuator 102 for each seeding row unit 62 is in fluid communication with the hydraulic pressure source 44 via an adjustment device 146, such as an electro-hydraulic control valve. In one embodiment, each adjustment device 146 is controlled by the central controller 122 via a multi-line cable 148.

The output signals 116 and 118 of the position sensors 112 and 114 are received by the respective local controller 126. Depending on the nature of the output signals 116 and 118, the local controller 126 can include whatever signal conditioning is necessary to process the output signals 116 and 118, such as amplification, analog-to-digital conversion, and/or frequency conversion. The local controller 126 also includes whatever output signal form for output 143 is required to communicate with the adjustment device 142 (e.g., analog or digital). In one embodiment, the central controller 122 receives a parameter, such as a desired differential height between the elevation 56 of the tillage row unit 52 and the elevation 66 of the seeding row unit 62, and converts this parameter to a set point for (e.g., a voltage or other signal, or the difference in the signals 116 and 118 corresponding thereto) for use by the local controller 126. In some embodiments, the local controller 126 also provides information regarding the down force FD of the seeding row unit 62 to the central controller 122, which the central controller 122 can use for control of the down force FD and for posting the down force FD on the display 125.

In various embodiments, operation of the seed planting system 30 can be as follows: Using the user interface 124, an operator enters a first set point that corresponds to a desired elevation differential between the seeding row unit 62 and the ground engagement attachment 52. The central controller 122 receives the first desired set point and passes it on to the local controllers 126. Each local controller 126 then manipulates the tillage row actuator 92 by manipulation of the adjustment device 142, causing the first signal 116 of position sensor 112 to respond in kind. The respective local controller 126 then calculates an actual elevation differential based on the first and second signals 116 and 118, and adjusts the output 143 accordingly. In this way, the local controllers 126 effectively provide closed loop control the elevation 56 of the tillage row unit 52 relative to the instantaneous elevation 66 of the seeding row unit 62. The local controllers can implement conventional control techniques, such as, but not limited to, proportional control, proportion-derivative control, proportional-integral control, or proportional-integral-derivative control.

It is noted that an actual conversion of the output signals 116 and 118 and/or the elevation differential to engineering units (e.g., centimeters or inches) can occur, but does not need to occur. The various signals and set points can, for example, be the result of calibrations performed on the equipment, without knowledge or conversion to engineering units of elevation.

Figure 4:
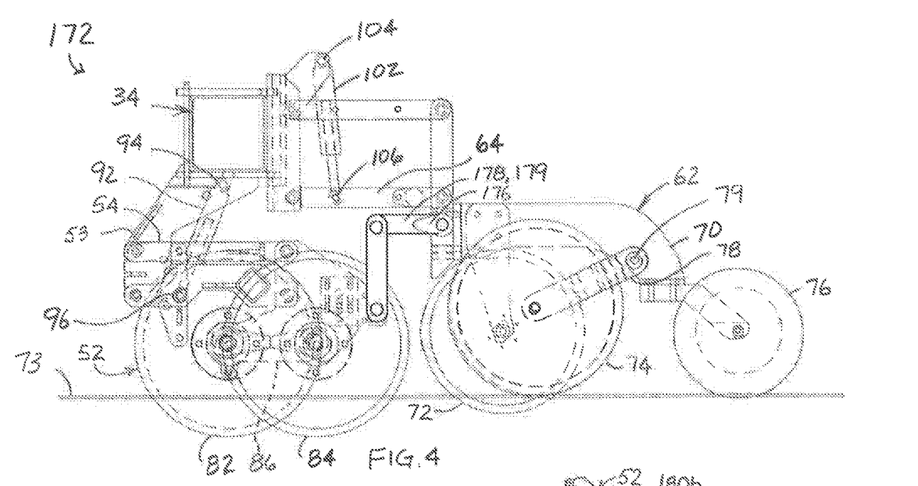
FIG. 4 is a transparent, elevation view of a seeding row assembly utilizing a single differential position sensor with a two-bar linkage in an embodiment of the disclosure.
Figures 4A, 4B:
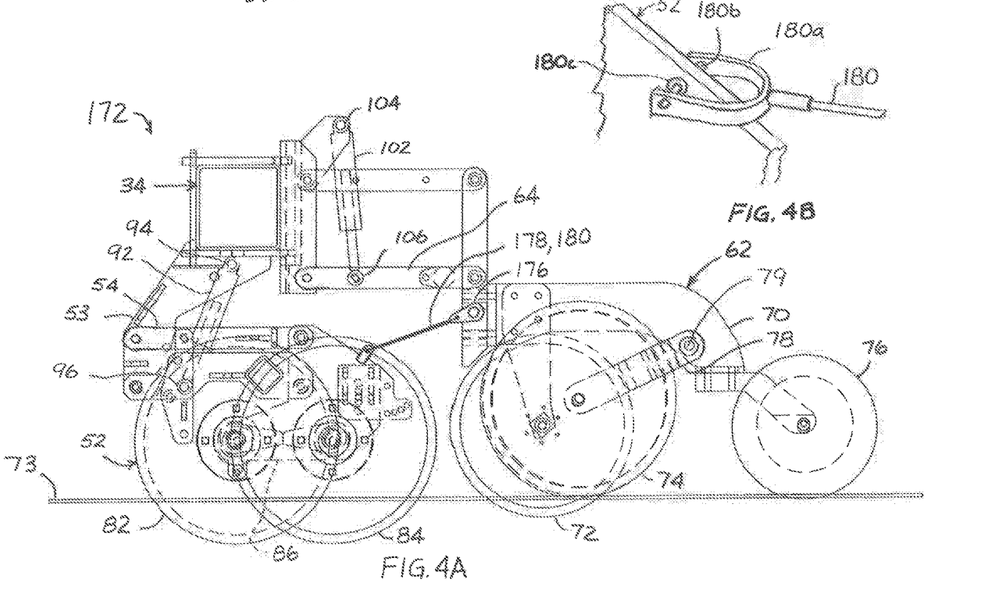
FIG. 4A is a transparent, elevation view of a seeding row assembly utilizing a single differential position sensor with a spring member linkage in an embodiment of the disclosure.
FIG. 4B is a partial view of a spring member linkage coupled to a tillage row unit in an embodiment of the disclosure.
Figure 5:
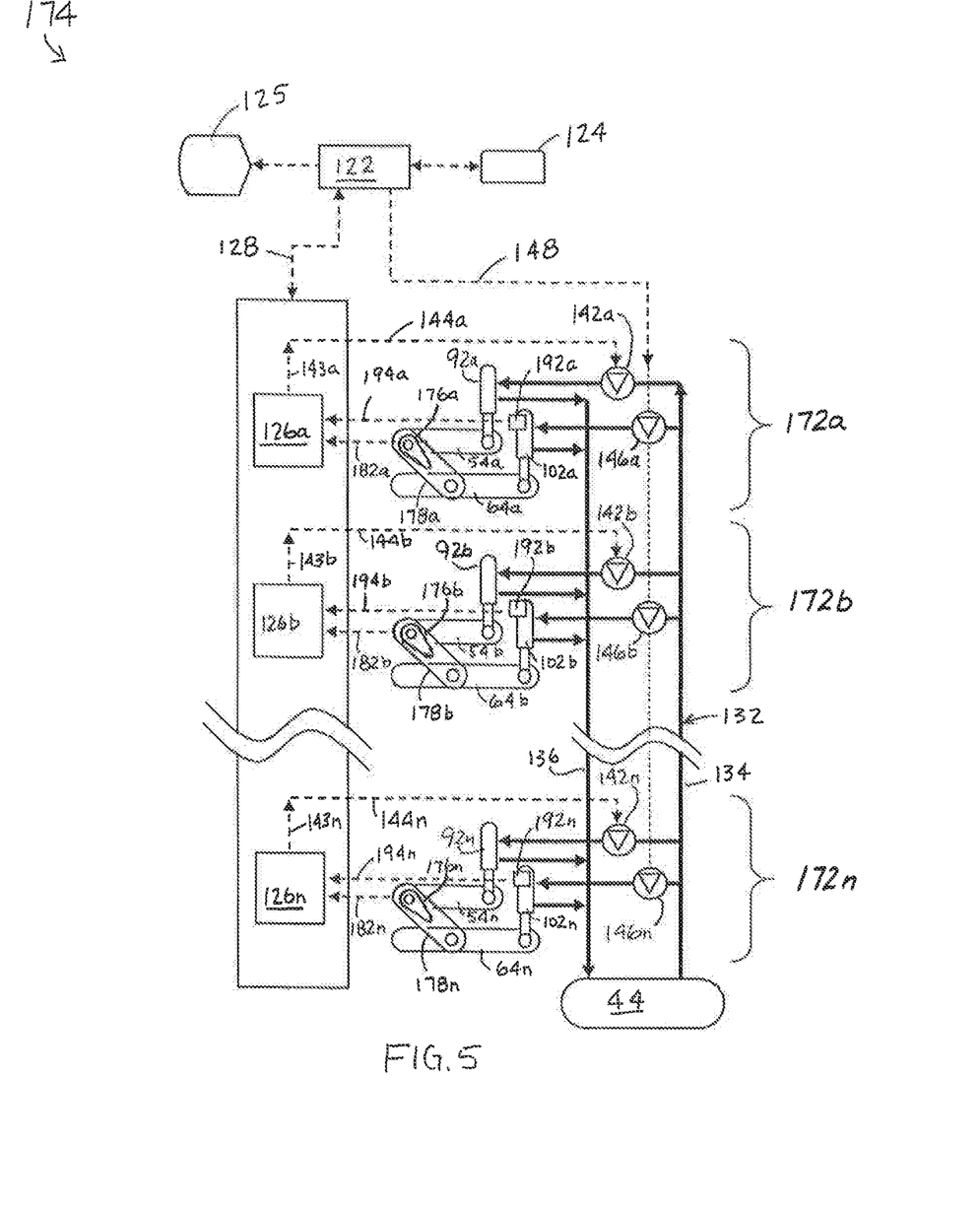
FIG. 5 is a schematic of a control system utilizing the differential position sensor of FIG. 4 in an embodiment of the disclosure.

Referring to FIGS. 4, 4A, and 5, a seeding row assembly 172 and attendant control system 174 is depicted in an embodiment of the disclosure. The seeding row assembly 172 and control system 174 include many of the same components and characteristics as the seeding row assembly 36 and control system 38, which are identified with like-numbered numerical references.

The components associated with the seeding row assemblies 172 are individually depicted in FIG. 5 by the numerical reference 172, followed by a letter suffix (e.g., seeding row assemblies 172a, 172b and 172n), which are collectively or generically referred to as seeding row assembly 172. Likewise, various components for each seeding row assembly 172 are referred to by a numerical reference followed by the same letter suffix as the respective seeding row assembly 172, the components being referred to collectively or generically by the numerical reference. In addition to the components identified attendant to FIG. 3 above, additional components numbered in this fashion include differential position sensor 176, linkage 178, signal output 182, pressure sensor 192, and output signal 194, described below.

The seeding row assembly 172 includes a differential position sensor 176 operatively coupled to a linkage 178 between the tillage row unit 52 and the seeding row unit 62. The linkage 178 may be a two-bar linkage 179 (FIG. 4), or a spring member 180 such as a coil spring, bungee cord, or elastomeric strap (FIG. 4A). For some embodiments utilizing the spring member 180, coupling of the spring member 180 to the tillage row unit 52 may be, for example, by an eye-and-hook arrangement (not depicted), with the hook affixed (e.g., crimped) to the spring member 180 engaging an eye formed on the tillage row unit 52. In other embodiments utilizing the spring member 180, coupling of the spring member 180 to the tillage row unit 52 may be accomplished by affixing the spring member 180 to a clevis 180a, with a rod 180b passing through the clevis and a corresponding aperture on the tillage row unit 52 (FIG. 4B).

A bearing or bushing 180c may be mounted within the aperture for smooth rotation of the rod 180b within.

Functionally, the differential position sensor 176 generates a signal output 182 that corresponds to the difference between elevations 56 and 66 of the tillage row unit 52 and the seeding row unit 62, respectively. The respective local controller 126 utilizes the signal output 182 in a way similar to the signal outputs 116 and 118 of FIG. 3, only without need for computing a difference between signals. The spring member 180 facilitates easy connection between the tillage row unit 52 and the seeding row unit 62. The spring member 180 need only be sized to remain in tension throughout the range of the vertical differential displacement between the tillage row unit 52 and the seeding row unit 62. The magnitude of the tension force exerted by the spring member 180 is inconsequential; the tension force need only be adequate to maintain the to keep the differential position sensor 176 in alignment with the spring member 180 as the height differential between the tillage row unit 52 and the seeding row unit 62 changes. The spring member 180 may also act to dampen or attenuate vibrations and impulse loads that would otherwise propagate from the tillage row unit 52 through the linkage 178 to the differential position sensor 176. By attenuating these vibrations and impulse loads, the signal-to-noise ratio of the differential position sensor 176 is inherently improved.

In the depicted embodiment, the seeding row units 62 are set to engage the terrain 73 at a predetermined down force FD. The down force FD is transferred to the follower 74, which rides over the terrain 73 of the field being planted. In other embodiments, the seeding row actuator 102 or linkage 64 can be equipped with a force sensor (not depicted) from which the down force FD can be inferred. In one embodiment, the respective local controller 126 receives an output signal 194 from the pressure sensor 192, which passes the information to the central controller 122 via the bus 128, which can be used for closed loop control. For embodiments where the seeding row actuator 102 is a hydraulic or pneumatic actuator, the seeding row actuator 102 can be equipped with a pressure sensor 192, from which the down force FD can be inferred.

Optionally, instead of inferring the force from an actuation pressure, a force sensor can be operatively coupled to the follower 74, for example a strain gauge (not depicted) operatively coupled to the pivot pin 79 of the pivot arm 78 to detect strain induced on the pivot pin 70 by the follower 74 and infer the down force FD therefrom.

Sudden irregularities in the terrain 73 are often encountered by any given seeding row assembly 36. The irregularities can be caused by a local rise or depression encountered by the seeding row assembly 36 that may not be traversed by the tires of the seeding implement 32. Conversely, a tire of the seeding implement 32 may encounter the local rise or depression, causing several of the seeding row assemblies 36 to effectively experience the irregularity. The adjustment device 146 can be equipped with a hydraulic accumulator or pneumatic buffer (neither depicted) that absorbs the sudden motion associated with the irregularity while reducing the effect of the disturbance on the applied down force FD. In this way, the follower 74 follows the terrain 73 and are engaged with the terrain 73 at a nominal registration force.

The seeding row assembly 172, as depicted, does not measure a parameter that is associated with either the elevation 66 of the seeding row unit 62 or the elevation 56 of the tillage row unit 52; rather, it measures the signal output 182 that corresponds to the difference between the elevations 56 and 66. The elevation 66 of the seeding row unit 62 is effectively a passive result, established by the follower 74 riding over the terrain 73 at a desired down force FD. This is true even where the down force FD (pressure) is controlled in closed loop form, because there is no measurement that corresponds directly to the elevation 66.

For purposes of this application, "automatic control" is not limited to closed loop control; and/or open loop control. Rather, the term "automatic control" refers to manipulation performed by the control system 38 over the multiple seeding row assemblies in response to a single command (e.g., entry of a single set point) by the operator, whether or not such response is in the form of open and/or closed loop control.

Alternatively, the seeding row assembly 172 can utilize a second position sensor (not depicted) for control of the elevation of the seeding row unit 62 to a predetermined depth, akin to the second position sensor 114 of FIGS. 2 and 3. Use of the second position sensor can be alternative to or in addition to the pressure sensor 192

Figure 6:
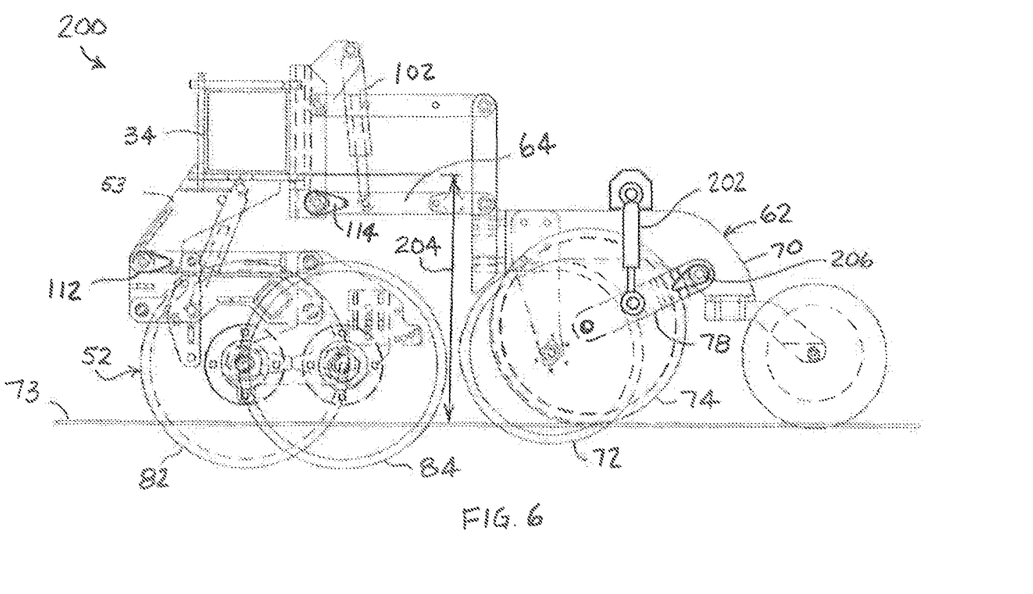
FIG. 6 is a transparent, elevation view of a seeding row assembly utilizing actuator-driven gauging wheels in an embodiment of the disclosure.

Referring to FIG. 6, a seeding row assembly 200 including an actuator 202 for adjusting an elevation 204 of the follower 74 is depicted in an embodiment of the disclosure. The actuator 202 can be coupled to the pivot arm 78, as depicted, or directly to the follower 74. A position sensor 206 can be operatively coupled to the pivot arm 78, generating an output signal corresponding to the elevation 204. The output signal 208 can be routed to the respective local controller 126 for transmittal back to the central processor 122 and subsequent posting on the display 125. Control of the actuator 202 can be similar to that of the seeding row assemblies 36, 172 (e.g., closed loop). The automatic adjustment of the follower 74 in this way can be implemented as part of the control system 38.

In the depicted embodiment, the actuator 202 is a linear hydraulic cylinders, which can be operatively coupled with hydraulic pressure source, for example the hydraulic pressure source 44 of the towing unit 42 via the circuit 132. Other type actuators can also be implemented, such as rotational hydraulic actuators, linear or rotational pneumatic actuators, and/or linear or rotational actuators powered by an electric motor.

Figure 7:
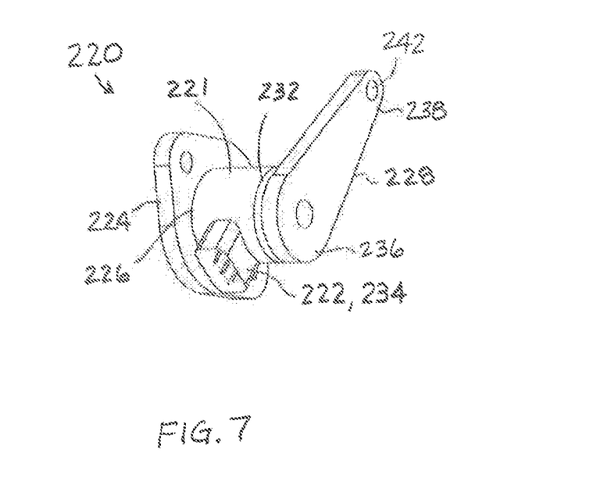
FIG. 7 is a perspective view of an angle sensor in an embodiment of the disclosure.

Referring to FIG. 7, a rotary position sensor 220 is depicted in an embodiment of the disclosure. The rotary position sensor 220 includes a sensor housing 221 within which a rotational sensor 222 is housed. The rotary position sensor 220 further includes a base portion 224 coupled to a first end 226 of the sensor housing 221 and a lever arm 228 coupled to an opposing second end 232 of the sensor housing 221. In various embodiments, the rotational sensor 222 includes a connector 234 that protrudes from the sensor housing 221 for connection to a mating connector (not depicted). The lever arm 228 can include a proximal end 236 and an opposing distal end 238, the proximal end 236 being operatively coupled to the rotational sensor 222. The distal end 238 can define a mounting aperture 242 for mounting external links and ties thereto.

The rotational sensor 222 can be any one of a number of rugged, compact sensors capable of sensing a differential rotation between the base portion 224 and the lever arm 228 (e.g., a rotating potentiometer or a hall effect rotary position sensor). Examples of such rotational sensors include the HRS Series Hall-Effect Rotary Position Sensors supplied by Honeywell, Inc. of Golden Valley, Minn., U.S.A.

Figure 8A:
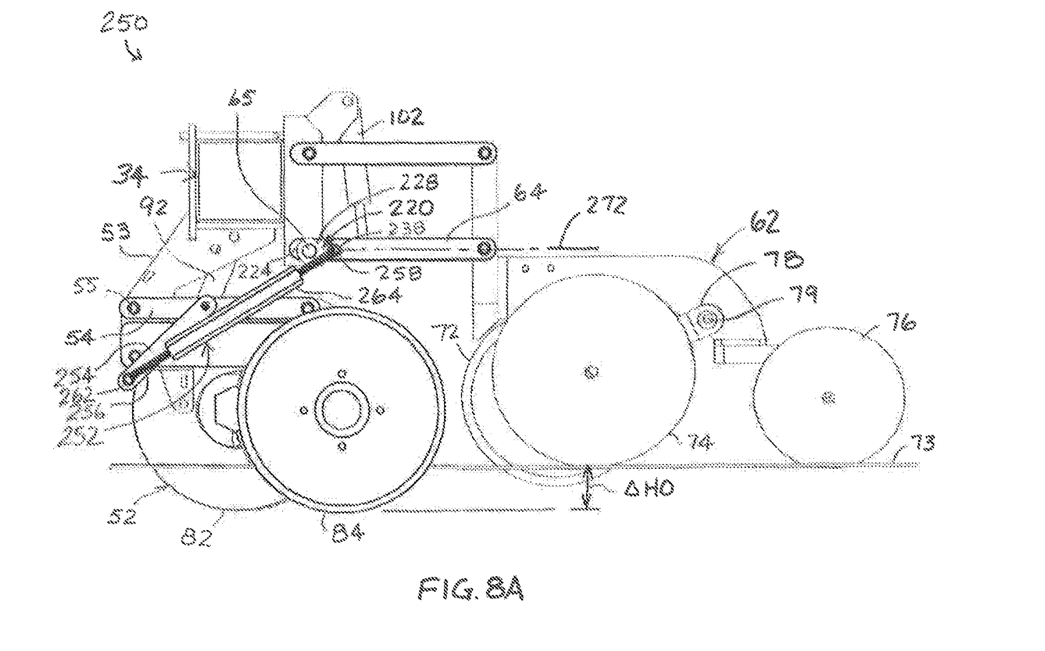
FIGS. 8A through 8D are elevation views of a seeding row assembly in operation utilizing a single angle sensor to determine elevation displacement of a tilling row unit relative to a seeding row unit in an embodiment of the disclosure.
Figure 8B:
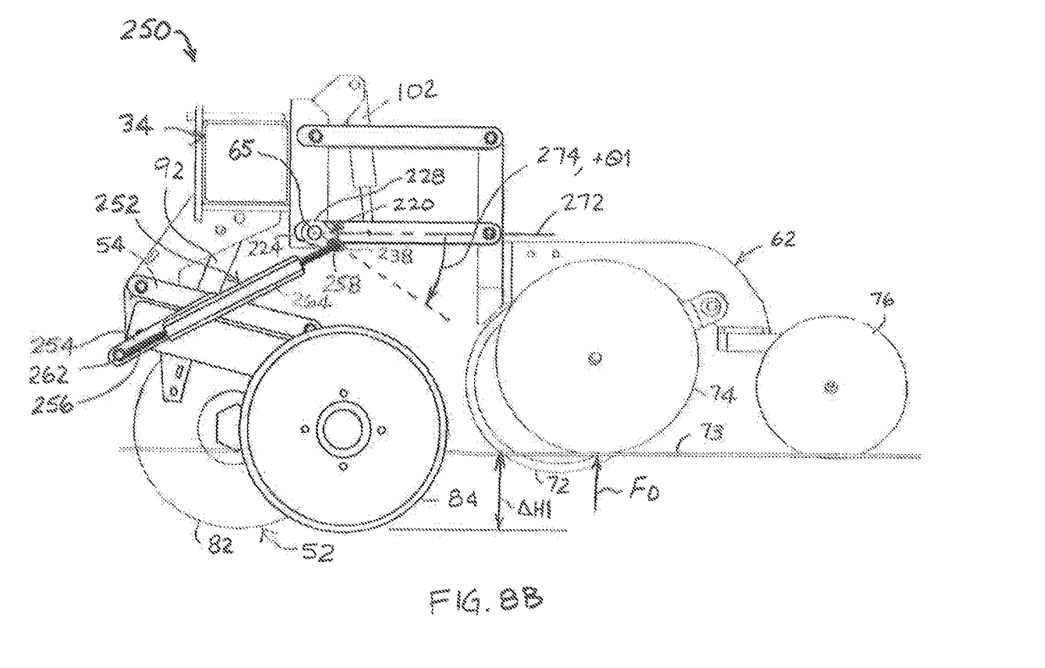
Figure 8C:
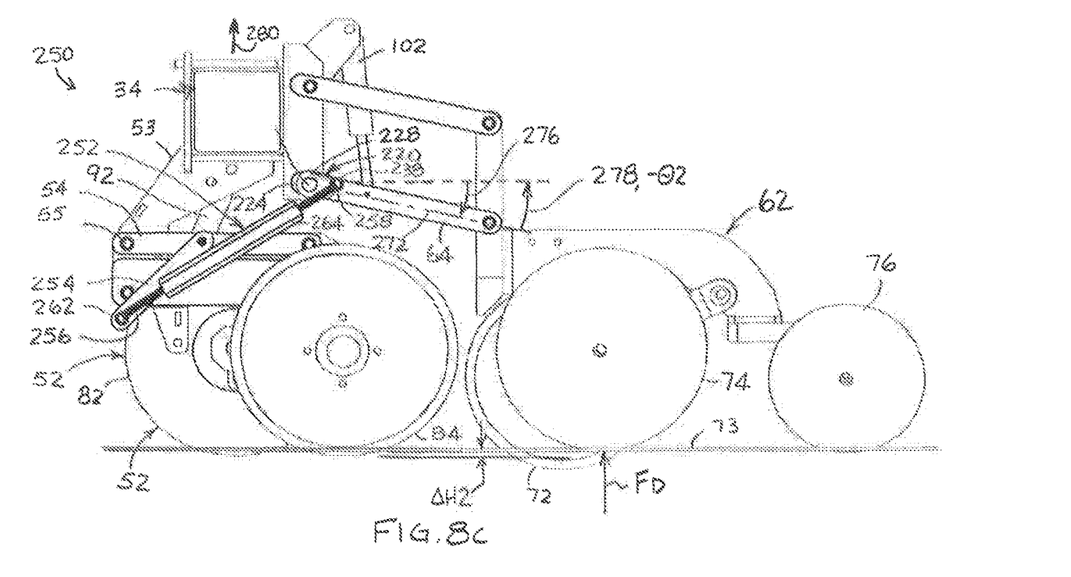

Referring to FIG. 8A through 8C, a seeding row assembly 250 utilizing only the rotary position sensor 220 is depicted in an embodiment of the disclosure. The seeding row assembly 250 includes many of the same components and features as the seed row assemblies 36, which are identified with same-numbered numerical references. In this embodiment, unlike the position sensor 114 of the seed row assemblies 36 which detect rotation of the linkage 64 about the pivot 65, the rotary position sensor 220 is arranged to detect the rotation of the tillage row unit 52 relative to the seeding row unit 62. From this rotation, a differential height ΔH0 of the tillage row unit 52 relative to the seeding row unit 62 can be inferred.

It is noted that, in the depicted embodiment, while the rotary position sensor 220 is not arranged to sense rotation about the pivot 65 of the linkage 64, the rotary position sensor 220 is still aligned with the pivot 65, thereby eliminating translation of the rotary position sensor 220 that could adversely affect the measurement of the rotation of the base portion 224 relative to the lever arm 228.

Sensing the rotation of the tillage row unit 52 relative to the seeding row unit 62 is accomplished by mounting the base portion 224 to the second linkage 64 and coupling the distal end 238 of the lever arm 228 to the first linkage 54 via a tie linkage 252. In the depicted embodiment, the tie linkage 252 includes a standoff 254 anchored in fixed relation to the first linkage 54, for example by welding thereto. A tie rod 256 is pivotally mounted on a first end 258 to the distal end 238 of the lever arm 228 of the rotary position sensor 220 and on a second end 262 pivotally mounted to the standoff 254. The tie rod 256 can comprise a threaded turnbuckle 264 for initial adjustment of the length of the tie rod 256 and initial orientation of the rotary position sensor 220.

The depictions of FIGS. 8A through 8D present the seeding row assembly 250 in four different orientations. The first orientation (FIG. 8A) depict the first linkage 54 and the second linkage 64 in orientations that are substantially parallel to each other. The second linkage 64 is characterized as defining a longitudinal axis 272, which also defines a datum line of the base portion 224 of the rotary position sensor 220.

The second orientation (FIG. 8B) depicts a scenario where the tillage row unit 52 is actuated by the tillage row actuator 92 to rotate away from the implement frame 34. The tie linkage 252 follows the rotation of the first linkage 54 so that the tie rod 256 causes the lever arm 228 to rotate in a clockwise direction 274 at an angle +θ1 relative to the base portion 224 of the rotary position sensor 220. The clockwise rotation establishes a differential height ΔH1 between the tillage row unit 52 and the seeding row unit 62 that is greater than the differential height ΔH0 of FIG. 8A.

The third orientation (FIG. 8C) depicts a scenario where the seeding row unit 62 and the second linkage 64 rotate in a clockwise direction 276. However, because the base portion 224 of the rotary position sensor 220 is coupled to the second linkage 64, as illustrated by the rotation of the datum 272, and the orientation of the lever arm 228 is maintained by the tie linkage 252, the rotational sensor 222 senses a counterclockwise rotation 278 at an angle −θ2 of the lever arm 228 relative to the base portion 224. The counterclockwise rotation establishes a differential height ΔH2 between the tillage row unit 52 and the seeding row unit 62 that is less than the differential height ΔH0 of FIG. 8A.

The fourth orientation (FIG. 8D) depicts a scenario where both the seeding row unit 62 and the tillage row unit 52 are rotated relative to the initial position of FIG. 8A. In the depicted scenario, the relative angular deflections of the seeding row unit 62 and the tillage row unit 52 are superimposed, effectively cancelling each other out, such that the reading of the rotary position sensor 220 correlates with substantially the same differential height ΔH0 as in FIG. 8A.

Figure 8D:
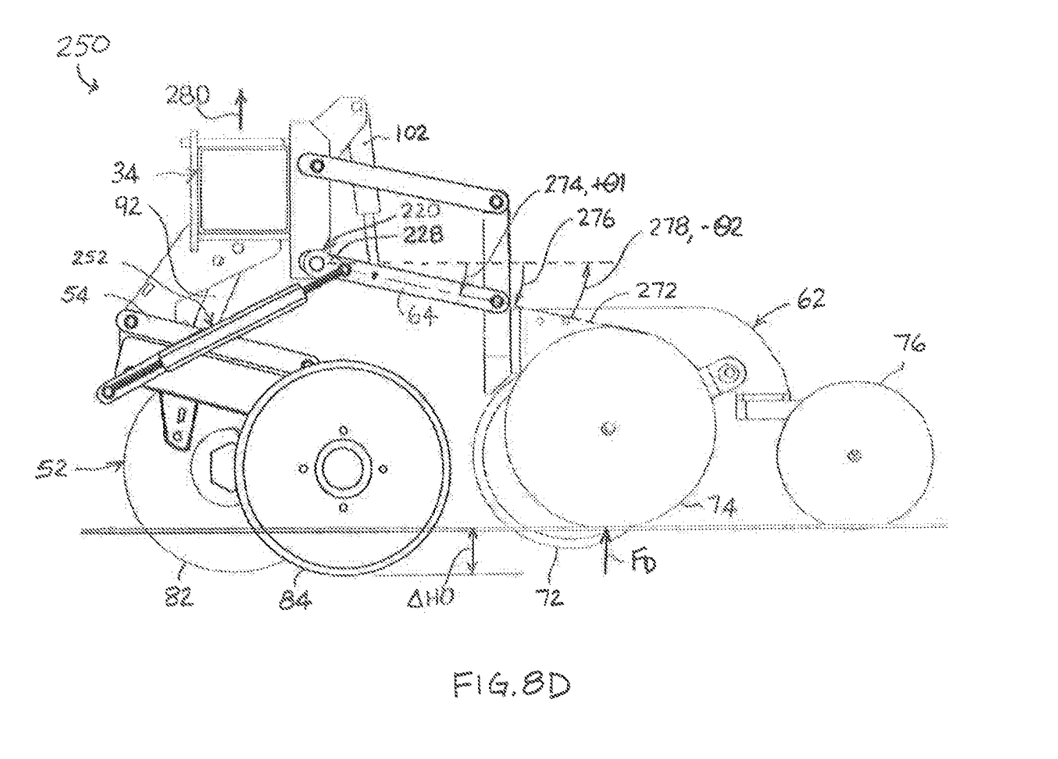

The scenarios of FIGS. 8A, 8C, and 8D depict operation of the seeding row assembly 250 occur upon encountering an irregularity in the terrain 73. Consider a scenario where the seeding row assembly 250 is configured to operate at a desired differential height ΔH0, as depicted in FIG. 8A, and the tire (not depicted) of the seeding implement 32 encounters a local rise in the terrain 73. The local rise causes the tire and seeding implement 32 to elevate, as depicted by arrow 280. Initially, the constant pressure setting of the seeding row actuator 102, being maintained by the hydraulic accumulator (or pneumatic buffer where pneumatics are utilized), forces the seeding row unit 62 downward to maintain registration of the follower 74 on the terrain 73 substantially at the targeted downward force. The rotation of the base 224 of the rotary position sensor 220 causes a detection of the rotational shift of angle −θ2, from which the local controller 126 infers the differential height ΔH2 (FIG. 8C), which generates a difference or detectable "error" between the actual differential height ΔH2 and the set point or target differential height ΔH0.

The detectable "error" causes the local controller 126 to seek the set point differential height ΔH0 by driving the tillage row unit 52, which in turn rotates the lever arm 228 of the rotary position sensor 220 in the rotational direction 276, generating a detected rotational shift of angle +θ1 (FIG. 8D). The detectable error is brought to within an acceptable dead band when the magnitudes of +θ1 and −θ2 are substantially the same. By this technique, the targeted differential height ΔH0 is maintained when the seed row assembly 250 encounters a terrain irregularity.

In operation, the signal generated by the rotary position sensor 220 is utilized in substantially the same manner as the signal output(s) 182 of the differential position sensor(s) 176, and substantially as depicted and described attendant to FIG. 5. That is, the output from the rotary position sensor 220 is used by the local controller(s) 126 as the feedback variable in a closed loop control to maintain a differential height between the tillage row unit 52 and the seeding row unit 62, the differential height being set via the central processor 122.

It is noted that, for the embodiment of FIGS. 8A through 8D, and unlike the sensing arrangement of FIGS. 4, 4A, and 5, there is no direct linkage between the seeding row unit 62 and the tillage row unit 52. The linkage 178 establishes a direct coupling between the seeding row unit 62 and the tillage row unit 52. The tie linkage 252 of the FIGS. 8A-8D arrangement does not establish such a coupling. The rotary position sensor 220 is closely proximate the implement frame 34; thus, the vibration and impulse loads transmitted through the tie linkage 252 are substantially similar to and correlate closely with the vibration and impulse loads imparted by the rigid frame member between the implement frame 34 and the first linkage 54. Accordingly, the additional vibration and impulse loads transferred between the tillage row unit 52 and the seeding row unit 62 via the tie linkage 252 is highly attenuated.

The following references, discussed above, are hereby incorporated by reference herein except for express definitions and claims found therein: U.S. Patent Application Publication No. 2013/0192186 to Bassett; U.S. Pat. No. 8,448,717 to Adams et al.

Each of the additional figures and methods disclosed herein can be used separately, or in conjunction with other features and methods, to provide improved containers and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant art will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A method for maintaining a seeding row assembly at a desired engagement configuration with the ground, comprising:
   mounting a sensor at a pivot that connects a linkage to an implement frame to detect rotation of said linkage about said pivot, said linkage coupling said implement frame to a seeding row unit;
   establishing a desired alignment of said sensor relative to an axis of said linkage;
   using said sensor to detect a rotation of said linkage about said pivot in response to a change in elevation of said seeding row unit relative to said implement frame, said rotation of said linkage causing a misalignment of said sensor and said axis of said linkage relative to said desired alignment; and
   driving an actuator to restore said desired alignment of said sensor relative to said axis of said linkage.

2. The method of claim 1, wherein said linkage in the step of arranging said sensor is a parallel linkage.

3. The method of claim 1, wherein said actuator in the step of driving said actuator is a hydraulic actuator.

4. The method of claim 1, wherein said actuator is coupled to a tillage row unit.

5. The method of claim 4, wherein the step of driving said actuator restores a preferred depth of said tillage row unit relative to said seeding row unit.

6. The method of claim 1, wherein said sensor is a rotary sensor.

7. The method of claim 1, wherein said desired alignment is a rotational alignment.

8. The method of claim 1, wherein said actuator in the step of driving an actuator is mounted to said implement frame and attached to said linkage.

* * * * *